United States Patent [19]

Collier

[11] Patent Number: 4,555,323

[45] Date of Patent: Nov. 26, 1985

[54] CHLORINATION DEVICE

[76] Inventor: Richard B. Collier, 957 Kolokolo Pl., Honolulu, Hi. 96825

[21] Appl. No.: 614,107

[22] Filed: May 24, 1984

[51] Int. Cl.[4] .......................... C02F 1/46; C25B 13/02
[52] U.S. Cl. .................................. 204/258; 204/128;
    204/98; 204/296; 204/257; 210/104; 210/120;
    210/123; 210/128; 210/130; 210/169; 210/192
[58] Field of Search ................ 204/98, 128, 149, 266,
    204/257, 258, 296; 210/104, 120, 123, 128, 130,
    137, 169, 192, 199, 205, 206, 220, 243

[56] References Cited

U.S. PATENT DOCUMENTS

| | | | |
|---|---|---|---|
| 3,361,663 | 1/1968 | Murray | 210/169 |
| 3,378,479 | 4/1968 | Colvin | 210/169 |
| 3,669,857 | 6/1972 | Kirkham | 210/169 |
| 3,801,992 | 4/1974 | Sable | 210/169 |
| 4,085,028 | 4/1978 | McCallum | 210/169 |
| 4,136,005 | 1/1979 | Persson | 204/266 |
| 4,229,272 | 10/1980 | Yates | 210/169 |
| 4,248,681 | 2/1981 | Sweeny | 204/128 |
| 4,381,240 | 4/1983 | Russell | 210/169 |
| 4,385,973 | 5/1983 | Reis | 210/746 |
| 4,470,891 | 9/1984 | Moore | 204/128 |

*Primary Examiner*—Ernest G. Therkorn
*Attorney, Agent, or Firm*—Christie, Parker & Hale

[57] ABSTRACT

A system to generate chlorine to disinfect a body of water. The system has a pump to move water through the system, a filter and an electrolytic cell able to generate chlorine by the electrolysis of sodium chloride and having an anode and a cathode mounted in a separate compartment. Chlorine is generated in the anode compartment and hydrogen in the cathode compartment. The compartments are in communication through an ion permeable membrane. There is a power source for the cell. The ion permeable membrane is formed as separate members, each covering an opening in a wall dividing the anode and cathode compartments. The anode and the cathode are located above the electrolyte. There is a mixing container divided into compartments, a first compartment to receive hydrogen and chlorine from the cell and provided with an outlet for water and the second compartment, in communication with the first and having an inlet for water, a float valve to control the inlet, the mixing container having a pressure relief outlet.

7 Claims, 5 Drawing Figures

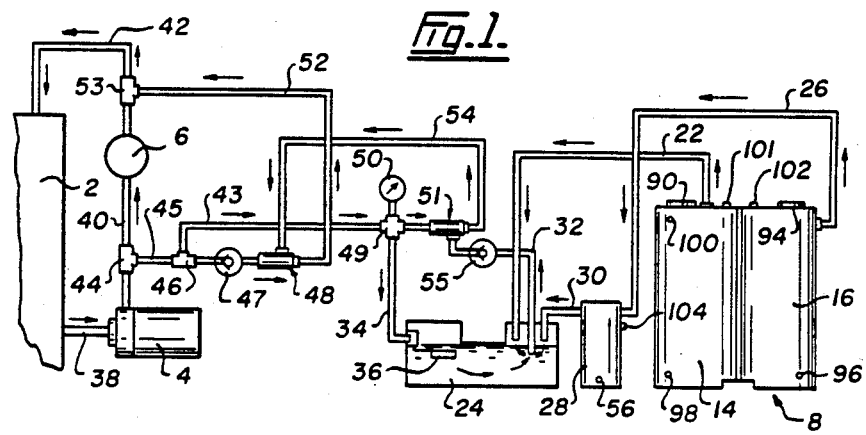

U.S. Patent    Nov. 26, 1985    Sheet 2 of 2    4,555,323
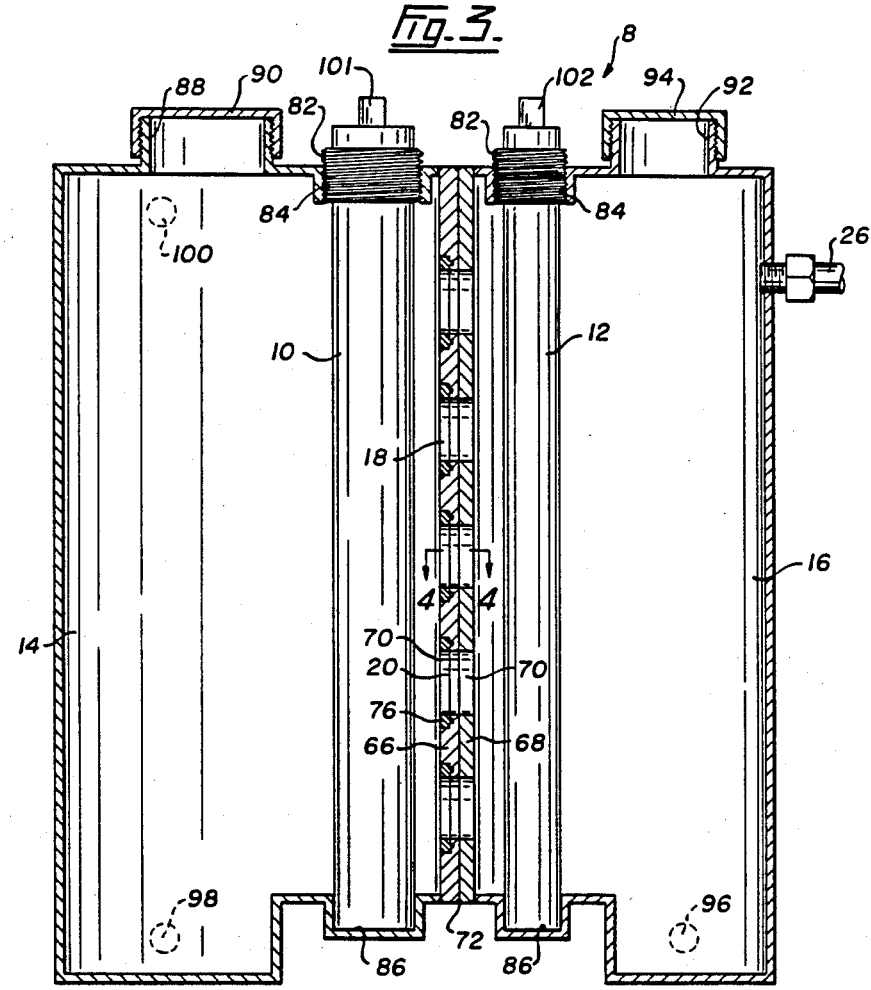
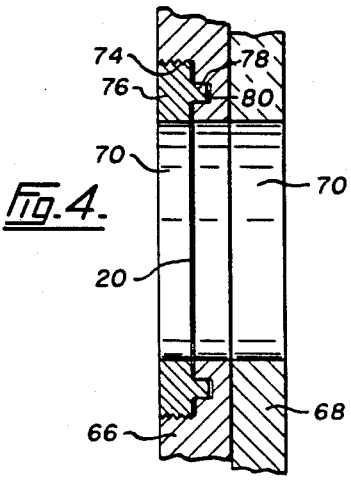

CHLORINATION DEVICE

FIELD OF THE INVENTION

This invention relates to a system to generate chlorine to disinfect a body of water and finds particular application in the treatment of swimming pools.

DESCRIPTION OF THE PRIOR ART

The sterilizing effect of chlorine, and its consequent use in swimming pools, is of considerable antiquity. Still the most common method of adding the necessary chlorine to swimming pools is by the use of hydrochloric acid in the case of large pools and, in smaller pools, the addition of compounds, such as hypochlorites, that decompose to provide chlorine.

The addition of chlorine in either of the above ways requires testing of the water to determine chlorine content and the addition of a certain amount of compound to provide the necessary chlorine content. This is time consuming and can be dangerous if errors are made.

As a result of the above disadvantages there have been several proposals to provide equipment able to control automatically the chlorine content of the water in a swimming pool. In the main these devices rely on electrolysis of a chloride, usually either hydrochloric acid or sodium chloride, to produce the necessary chlorine. That chlorine is then mixed with the water to be used in the swimming pool. Chlorine generation can be controlled automatically, for example either by timing the electrolysis, by measuring the chlorine pressure in the electrolytic cell in which the chlorine is generated or by chemical sensors. It is thus only necesary, apart from routine cleaning at relatively wide intervals, to provide the necessary inorganic compounds to the electrolysis cell to continue to produce chlorine.

Despite the attractiveness of such schemes and despite the number of attempts to produce such apparatus acceptance by the public has not been good. It will be appreciated that malfunctions of equipment producing chlorine can be extremely hazardous and the prior art machines have been prone to malfunction. In certain cases malfunctioning has been accompanied by explosions of the electrolytic cell.

Examples of the prior art relating to chlorine generation includes U.S. Pat. Nos. 4,385,973 to Ries; 4,381,240 to Russell; 4,256,552 to Sweeney; 4,250,126 to Yates; 4,229,272 to Yates; 4,085,028 to McCallum; 3,669,857 to Kirkham and 3,458,414 to Crane.

As indicated none of this prior art has achieved significant acceptance and commercial success. In certain instances, for example the patent to Russel, hydrohloric acid is used. As hydrochloric acid is an extremely corrosive acid, its use particularly in private swimming pools, is not to be recommended.

SUMMARY OF THE INVENTION

The present invention seeks to provide equipment that is simple in use, robust in construction and extremely safe. Trials conducted with the equipment according to one embodiment of the invention have provided smooth and safe running for a considerable time.

Accordingly the present invention is a system to generate chlorine to disinfect a body of water, the system including a pump to move water through the system, a filter and an electrolytic cell able to generate chlorine by the electrolysis of sodium chloride and having an anode and a cathode, each mounted in a separate compartment with chlorine generation in the anode compartment and hydrogen generation in the cathode compartment, the compartments being in communication through an ion permeable membrane, a power source for the cell, the improvement comprising (a) the ion permeable membrane is formed as a plurality of separate members, each covering an opening in a wall dividing the anode and cathode compartments; (b) the anode and the cathode are located by means positioned above the electrolyte; and (c) a mixing container divided into a plurality of compartments, a first compartment to receive hydrogen and chlorine from the cell and provided with an outlet for water and the second compartment, in communication with the first and having an inlet for water, a float valve to control the inlet, the mixing container having a pressure relief outlet.

It should be noted that ion permeable membranes are well-known. The above prior art lists a number of such membranes. Probably the most popular material to make these membranes is that available under the trade mark Nafion which is a perfluorosulphonic membrane. However according to the present invention any ion permeable membrane may be used.

BRIEF DESCRIPTION OF THE DRAWINGS

Aspects of the invention are illustrated, merely by way of example, in the accompanying drawings in which:

FIG. 1 is a schematic view of a system according to the present invention;

FIG. 2 is a plan view of an electrolytic cell useful in the system according to the present invention;

FIG. 3 is a section to an electrolytic cell useful in the system of the present invention;

FIG. 4 is a detail on the line 4—4 in FIG. 3; and

FIG. 5 illustrates an eductor valve useful in the system of FIG. 1.

DESCRIPTION OF THE PREFERRED EMBODIMENTS

FIG. 1 shows a system to generate chlorine to disinfect a body of water in , for example, a pool 2. The system includes such conventional items as a pump 4 to move water through the system, the necessary conduits, a filter 6, and an electrolytic cell 8 able to generate chlorine by the electrolysis of sodium chloride. As particularly illustrated in FIG. 3 the cell 8, as is conventional in this art, has an anode 10 and a cathode 12, each mounted in a separate compartment, an anode compartment 14 and a cathode compartment 16. Chlorine generation takes place, of course, in the anode compartment 14 and hydrogen is generated in the cathode compartment 16. The compartments 14 and 16 are in communication through ion permeable membrane 18. There is, of course, a power source (not shown) for the cell 8.

In the system of the present, invention chlorine is generated in the anode compartment 14 and passes through conduit 22 to mixing container 24. Hydrogen gas from the cathode compartment 16 is fed through conduit 26 to an overflow vessel 28 then through conduit 30 to container 24. Water is fed from the container 24 through conduit 32 and into it through conduit 34 controlled by float valve 36 in conventional manner. The water is driven through the system by pump 4, which takes water from the pool 2 through conduit 38 and feeds it through the filter 6 through conduit 40.

After filter 6 water passes through conduit 42 back to the pool 2. However T-piece 44 ensures that part of the water passes to conduit 45 to T-piece 46 to check valve 47 and eductor valve 48. At T-piece 46 water is taken through conduit 43 through connector 49 attached to pressure switch 50, to second eductor 51, and to conduit 34. At eductor valve 48 in conduit 45 water passes into conduit 52 to T-piece 53 into conduit 42. Water continues past second eductor 51 into conduit 54 back to eductor 48 and thus into conduit 52. There is a check valve 55 in conduit 32.

The power source (not shown) to the cell is, as is conventional, by variable control rectifier with a timer to control the switching on and off of the rectifier. Furthermore the pressure switch 50 shuts down the rectifier if pressure sensed by the pressure switch 50 falls below a certain value, typically two pounds water pressure.

The pump 4 and filter 6 are entirely conventional. The overflow vessel 28 is a simple closed vessel functioning to prevent sodium hydroxide, from the cathode compartment 16, entering the mixing container 24. The overflow vessel 28 is provided with drain valve 56 to allow the draining of sodium hydroxide from the overflow vessel 28 from time to time.

The check valves are conventional. Check valve 47 acts to prevent the pump 4 and the filter 6 from losing prime. Check valve 55 acts to prevent eductor valve 51 losing prime and to prevent chlorine passing back from the eductor 51 into conduit 32. Check valve 55 prevents flooding of container 24, especially when the pool is higher than the chlorine generating and supplying equipment.

The eductor valves 48 and 51 may, similarly, be conventional. For example valves available from Pardee Engineering in California have proved useful. As shown particularly in FIG. 5 these eductors comprise a nozzle 60, a main body 62 housing the nozzle 60 and housing a diffuser member 64. The flow of water in the direction of the arrows A creates suction at conduits 32 and 54 so that chlorine from mixing container 24 may enter the eductor valve 51 through conduit 32 to be mixed with water flowing through conduit 43. Eductor valve 48 acts to provide a boost to flow through eductor valve 51. The valves 48 and 51 is of particular value in the present application because it contains no moving parts, acting simply on the Venturi principle, and can be made of materials able to resist the corrosive environment of swimming pools.

In the electrolytic cell 8 the anode compartment 14 and the cathode compartment 16 each include a wall 66 and 68. These walls 66 and 68 are each formed with a plurality of discrete openings 70, that align in pairs, one opening of the cathode compartment and one opening of the anode compartment, when the two compartments are placed together to make the electrolytic cell, as shown in FIG. 3. The two compartments are welded together as shown at 72. Each opening 70 in one compartment, the anode compartment 14 as shown in FIG. 3, is formed with an internal thread 74 as shown particularly in FIG. 4. An externally threaded ring 76 for example of polytetra fluoroethylene, having projections 78 to engage in recesses 80 formed in the ring 76 engages the internal thread 74. The ion permeable membrane 20, for example of poly fluorosulphonic acid available under the trade mark Nafion, is then located in the opening by clamping it between the wall 66 and the ring 76 as shown particularly in FIG. 4.

FIG. 3 illustrates a preferred aspect of the present invention in that the cathode 12 and anode 10 are both mounted in the top of the electrolytic cell 8, free of the electrolyte. Typically the anode will be graphite and the cathode of carbon steel, but the particular composition details are not important. The anode 10 and the cathode 12 are located by external collars 82 mounted to engage in internally threaded openings 84 in the cell 8. At the base of the cell the anode and cathode fit into simple recesses 86 that act merely to stabilize the position of the anode and the cathode in the cell.

The anode compartment 14 is provided with an opening 88 at its top closed by top 90. The cathode compartment 16 is provided with an opening 92 closed by top 94. The cathode cell 16 has a drain valve shown at 96. The anode compartment 14 desirably has flood and drain valves 98 and 100 respectively, principally because chlorate builds up in the anode compartment 14 and its removal can be dangerous.

The electrolytic cell 8 may desirably be of polytetrafluoroethylene, for example available under the trade mark Teflon. This material has excellent structural strength and is highly resistant to the corrosive electrolyte present in the cell. The threequarter round structure as shown in FIG. 2 is for strength.

The collars 82 are desirably made of polytetrafluoroethylene. Connecting terminals 101 and 102 are provided on the anode 10 and the cathode 12.

As indicated when the pressure in the system falls below a certain value, for example two pounds per square inch, the pressure sensitive switch 50 switches off the rectifier to prevent power reaching the cell and thus stops the electrolysis. A pressure relief valve 104 is provided in mixing container 24.

To operate the illustrated system sodium chloride is placed in the anode compartment 14 and water added to produce the necessary solution. Water is placed in the cathode compartment 16 to the level of conduit 26. The anode 10 is connected to the positive terminal of a variable rectifier, or D.C. power supply, the cathode 12 is connected to the negative terminal of the rectifier. Electrolysis then commences. It is not believed that a discussion of the electrolysis reactions are necessary. They are, of course, entirely conventional. Chlorine developed in the anode compartment 14 is fed to the mixing container 24, into conduit 32 and then into the water in conduit 43. Hydrogen generated in the cathode compartment 16 is passed to the overflow vessel 28. The pump 4 is started and the equipment is then ready for use. Oxygen is also generated in the anode compartment and is passed, with the chlorine, into the eductor valve 51 and into conduit 54. Oxygenation of the water also has a sterilizing effect. In the container 24 all the gases, chlorine, hydrogen and oxygen are mixed with water then fed into the eductor valve 51 through conduit 32.

Water is taken into conduit 45 between the pump 4 and the filter 6 because water pressure is greater there. The filter 6 then acts as a pressure reducer. After the filter 6 the return conduit 52 joins conduit 42 because the pressure is less after the filter.

When water is generated in the cathode compartment it overflows, together with sodium hydroxide produced at the cathode, into the overflow vessel 28, the trapping of the sodium hydroxide thus becomes an important function of the overflow vessel 28.

As the apparatus operates sodium chlorate builds up in the anode compartment 14, sodium chlorate has an adverse effect on the solubility of sodium chloride. As a result it is necessary periodically to switch off the equipment to backwash the electrolytic cell 8. To do this first the anode compartment 14 is flooded by forcing water through flood valve 98 to force excess chlorine and oxygen out of the cell. The drain valve 100 may then be opened to empty the contents of the anode compartment 14. Sodium chloride may then be added, as described previously.

I claim:

1. In a system to generate chlorine to disinfect a body of water, the system including a pump to move water through the system, a filter and an electrolytic cell able to generate chlorine by the electrolysis of sodium chloride and having an anode and a cathode, each mounted in a separate compartment with chlorine generation in the anode compartment and hydrogen generation in the cathode compartment, the compartments being in communication through an ion permeable membrane, a power source for the cell, the improvement comprising:
   (a) the ion permeable membrane is formed as a plurality of separate members, each covering an opening in a wall dividing the anode and cathode compartments;
   (b) the anode and the cathode are located by means positioned above the electrolyte; and
   (c) a mixing container divided into a plurality of compartments, a first compartment to receive hydrogen and chlorine from the cell and provided with an outlet for water and the second compartment, in communication with the first and having an inlet for water, a float valve to control the inlet, the mixing container having a pressure relief outlet.

2. A system as claimed in claim 1 in which the anode and cathode are located by the provision of externally threaded stainless steel collars adjacent their upper ends to engage in internally threaded collars in the cell.

3. A system as claimed in claim 1 in which each cell compartment has a drain valve.

4. A system as claimed in claim 3 in which the anode compartment has flood and drain valves.

5. A system as claimed in claim 1 in which the overflow vessel has a drain valve.

6. A system as claimed in claim 1 including a pressure sensitive switch sensing pressure at the inlet of the mixing container and connected to the power source, whereby when the sensed pressure falls below a predetermined value the power source is switched off.

7. A system as claimed in claim 1 in which the ion permeable membrane members are each located in a threaded recess to receive each membrane member; and a threaded ring to engage each recess to clamp the membrane members in the threaded recess.

* * * * *